(12) United States Patent
Im et al.

(10) Patent No.: US 9,830,869 B2
(45) Date of Patent: Nov. 28, 2017

(54) LIGHT UNIT AND DISPLAY DEVICE INCLUDING THE SAME

(71) Applicant: SAMSUNG DISPLAY CO., LTD., Yongin, Gyeonggi-do (KR)

(72) Inventors: Tae Gon Im, Gyeonggi-do (KR); Song Yi Han, Chungcheongnam-do (KR); Young Sup Kwon, Gyeonggi-do (KR); Eun Chul Shin, Chungcheongnam-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 201 days.

(21) Appl. No.: 14/524,535

(22) Filed: Oct. 27, 2014

(65) Prior Publication Data

US 2015/0116382 A1    Apr. 30, 2015

(30) Foreign Application Priority Data

Oct. 30, 2013    (KR) .................. 10-2013-0130533

(51) Int. Cl.
*G09G 3/36*    (2006.01)
*G09G 3/34*    (2006.01)
*H05B 33/08*   (2006.01)

(52) U.S. Cl.
CPC ......... *G09G 3/3607* (2013.01); *G09G 3/3406* (2013.01); *H05B 33/086* (2013.01);
(Continued)

(58) Field of Classification Search
CPC ............................ G09G 3/342; G09G 3/3406
See application file for complete search history.

(56) References Cited

U.S. PATENT DOCUMENTS 6,864,641 B2 *   3/2005   Dygert ............... H05B 33/0815
                                                       315/194
7,402,960 B2 *   7/2008   Kajita ................ H05B 33/0815
                                                       315/127
(Continued)

FOREIGN PATENT DOCUMENTS

JP      2013-102218       5/2013
KR    1020040028976       4/2004
(Continued)

*Primary Examiner* — Dorothy Harris
(74) *Attorney, Agent, or Firm* — F. Chau & Associates, LLC

(57) ABSTRACT

A light unit includes a DC/DC converter. A plurality of unit light emitting diode columns receive a voltage applied from the DC/DC converter. A plurality of transistors, respectively, are connected to the plurality of unit light emitting diode columns. A current deviation compensating unit compensates for deviations between currents respectively flowing through the plurality of unit light emitting diode columns by a pulse current width modulation average current control method. A connection switch sequentially connects the current deviation compensating unit with the plurality of transistors. A resistor is connected to output terminals of the plurality of transistors. A switch controller controls connection between the connection switch and the current deviation compensating unit based on a signal applied to the resistor.

15 Claims, 7 Drawing Sheets

(52) U.S. Cl.
CPC .............. *G09G 2300/0809* (2013.01); *G09G 2310/027* (2013.01); *G09G 2320/0626* (2013.01)

(56) References Cited

U.S. PATENT DOCUMENTS

| | | |
|---|---|---|
| 8,049,439 B2 | 11/2011 | Zhao et al. |
| 8,330,393 B2 | 12/2012 | Thomson et al. |
| 8,334,662 B2* | 12/2012 | Jin ..................... H05B 33/0818 315/291 |
| 2006/0022616 A1* | 2/2006 | Furukawa ......... G02F 1/133603 315/309 |
| 2006/0022918 A1* | 2/2006 | Tang ................. H05B 33/0821 345/84 |
| 2007/0024213 A1* | 2/2007 | Shteynberg ........ H05B 33/0815 315/291 |
| 2007/0080911 A1* | 4/2007 | Liu ........................ G09G 3/342 345/82 |
| 2008/0116818 A1* | 5/2008 | Shteynberg ........ H05B 33/0815 315/192 |
| 2009/0295775 A1* | 12/2009 | Kim ................... H05B 33/0815 345/212 |
| 2009/0302776 A1* | 12/2009 | Szczeszynski ..... H05B 33/0815 315/246 |
| 2009/0322234 A1* | 12/2009 | Chen .................. H05B 33/0815 315/159 |
| 2010/0164403 A1* | 7/2010 | Liu ...................... H05B 33/086 315/297 |
| 2010/0221027 A1* | 9/2010 | Inukai .................. G03G 15/326 399/51 |
| 2011/0140627 A1* | 6/2011 | Kong ................ H05B 33/0818 315/250 |
| 2011/0181625 A1* | 7/2011 | Shin .................. H05B 33/0851 345/690 |
| 2011/0309765 A1* | 12/2011 | Hsieh ....................... G09G 3/32 315/250 |
| 2012/0043912 A1 | 2/2012 | Huynh et al. |
| 2012/0105492 A1* | 5/2012 | Li ...................... H05B 33/0827 345/690 |
| 2013/0314064 A1* | 11/2013 | Theiler ................ G09G 3/3406 323/282 |
| 2014/0085731 A1* | 3/2014 | Farris ................ H05B 33/0827 359/630 |
| 2014/0306530 A1* | 10/2014 | Theiler ............... H02M 3/1584 307/31 |

FOREIGN PATENT DOCUMENTS

| | | |
|---|---|---|
| KR | 2020110000006 | 1/2011 |
| KR | 1020130001640 | 1/2013 |

* cited by examiner

LIGHT UNIT AND DISPLAY DEVICE INCLUDING THE SAME

CROSS-REFERENCE TO RELATED APPLICATION

This application claims priority to Korean Patent Application No. 10-2013-0130533 filed in the Korean Intellectual Property Office on Oct. 30, 2013, the disclosure of which is incorporated by reference herein in its entirety.

TECHNICAL FIELD

Exemplary embodiments of the present invention relate to displays, and more specifically, to a light unit including a current deviation compensating unit and a display device including the same.

DISCUSSION OF THE RELATED ART

Light emitting diodes (LED) may be used as light source of a flat panel display such as a liquid crystal display (LCD).

The LEDs may have different resistance values, and thus, the quality of images displayed may be deteriorated.

SUMMARY

An exemplary embodiment of the present invention provides a light unit. The light unit includes a DC/DC converter. A plurality of unit light emitting diode columns receive a voltage applied from the DC/DC converter. A plurality of transistors, respectively, are connected to the plurality of unit light emitting diode columns. A current deviation compensating unit compensates for deviations between currents respectively flowing through the plurality of unit light emitting diode columns. A connection switch sequentially connects the current deviation compensating unit with the plurality of transistors. A resistor is connected to output terminals of the plurality of transistors. A switch controller controls connection between the connection switch and the current deviation compensating unit based on a signal applied to the resistor.

The switch controller may count pulses of the signal applied to the resistor and controls the connection switch based on the pulse count.

The switch controller may further include a counter counting the pulses of the signal applied to the resistor.

The switch controller may compare the pulse count with a predetermined value to disconnect the connection switch from a transistor and connect the connection switch with another transistor when the pulse count is larger than the predetermined value.

The switch controller may compare the pulse count with a predetermined value and to determine whether a transistor connected to the connection switch is a last transistor when the pulse count is larger than the predetermined value and disconnects the connection switch from the transistor when the transistor is not the last transistor and connect the connection switch with another transistor.

The switch controller may compare the pulse count with a predetermined value and to determine Whether a transistor connected to the connection switch is a last transistor when the pulse count is larger than the predetermined value to disconnect the connection switch from the transistor when the transistor is the last transistor and to connect the connection switch with a first transistor.

An exemplary embodiment of the present invention provides a display device. The display device includes a display panel. A gate driver is connected to the display panel. A data driver is connected to the display panel. A light unit provides light to the display panel. A signal controller controls the display panel, the gate driver, the data driver, and the light unit. The light unit includes a DC/DC converter. A plurality of unit light emitting diode columns receive a voltage applied from the DC/DC converter. A plurality of transistors, respectively, are connected to the plurality of unit light emitting diode columns. A current deviation compensating unit compensates for deviations between currents flowing through the plurality of unit light emitting diode columns by a pulse current width modulation average current control method. A connection switch sequentially connects the current deviation compensating unit with the plurality of transistors. A resistor is connected to output terminals of the plurality of transistors. A switch controller controls connection between the connection switch and the current deviation compensating unit based on a signal applied to the resistor.

According to an exemplary embodiment of the present invention, a light unit comprises a DC/DC converter. A plurality of light emitting diode (LED) rows are connected in parallel with each other, the plurality of LED rows connected with the DC/DC converter. A plurality of transistors respectively are connected to the plurality of unit light emitting diode columns. A resistor is connected to the plurality of transistors. A current deviation compensating unit is connected with the resistor. The current deviation compensating unit is configured to allow a same average current to flow through the plurality of LED rows. A connection switch sequentially connects the current deviation compensating unit with the plurality of transistors. A switch controller is configured to control connection between the connection switch and the current deviation compensating unit based on a signal applied to the resistor.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Figure 1:
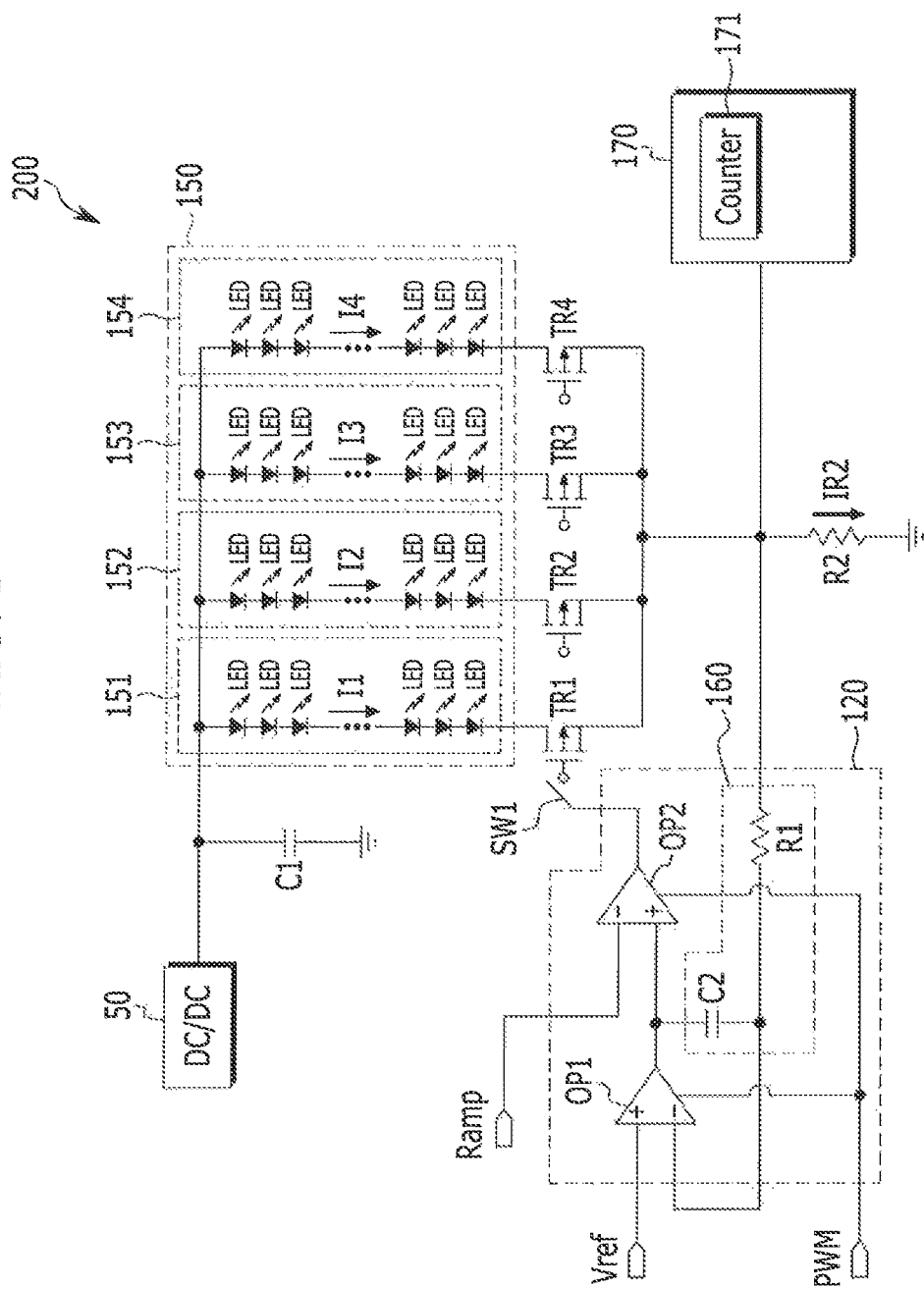
FIG. 1 is a circuit diagram of a light unit according to an exemplary embodiment of the present invention.

Hereinafter, exemplary embodiments of the present invention will be described in detail with reference to the accompanying drawings. The present invention, however, may be modified in various different ways, and should not be construed as limited to the embodiments set forth herein. Like reference numerals may designate like or similar elements throughout the specification and the drawings. It will be understood that when an element such as a layer, film, region, or substrate is referred to as being "on" or "connected to" another element, it can be directly on or connected to the other element or intervening elements may also be present. As used herein, the singular forms "a," "an," and "the" are intended to include the plural forms as well, unless the context clearly indicates otherwise.

According to an exemplary embodiment of the present invention, a current deviation compensating unit 120 controls a light unit including a plurality of unit light emitting diode columns to emit light with the same luminance (or similar luminance within an allowable range) although the unit light emitting diode columns have different characteristics (hereinafter, as an example of such characteristics, voltage drop (Vf) values are described).

FIG. 1 is a circuit diagram of a light unit according to an exemplary embodiment of the present invention.

The light unit 200 according to an exemplary embodiment of the present invention includes a light source unit 150 emitting light and an LED controller 100.

The LED controller controls light generation of the light source unit 150. The LED controller includes a DC/DC converter 50, a first capacitor C1, a current deviation compensating unit 120, a second resistor R2, and a switch controller 170.

The DC/DC converter 50 is connected to a first terminal of the first capacitor C1 and the light source unit 150. A second terminal of the first capacitor C1 is grounded. According to an exemplary embodiment of the present invention, the DC/DC converter 50 and the first terminal of the first capacitor C1 are connected to anodes of light emitting diodes LED in light emitting diode columns 151, 152, 153, and 154.

The DC/DC converter 50 provides a voltage to each diode. The voltage is stored in the first capacitor C1 and applied to the light source unit 150. According to an exemplary embodiment of the present invention, the DC/DC converter 50 provides a voltage to each diode based on a dimming signal. Each diode according to an exemplary embodiment of the present invention emits light when the dimming signal is in a high state and does not emit light when the dimming signal is in a low state.

The light source unit 150 includes a plurality of light emitting diodes LED, and the plurality of light emitting diodes LED is divided into a plurality of groups, respectively forming the unit light emitting diode columns 151, 152, 153, and 154. Each of the unit light emitting diode columns 151, 152, 153, and 154 may have a plurality of light emitting diodes LED connected to each other in series.

According to an exemplary embodiment of the present invention, a voltage is applied from the DC/DC converter 50 to each of the unit light emitting diode columns 151, 152, 153, and 154. A voltage that is voltage-converted by the DC/DC converter 50 may be input to the anodes of the light emitting diodes LED in each of the unit light emitting diode columns 151, 152, 153, and 154 and output through cathodes thereof.

Since the light emitting diodes LED have different voltage drop (Vf) values, the unit light emitting diode columns 151, 152, 153, and 154 may also have different voltage drop (Vf) values. Accordingly, respective currents I1, I2, I3, and I4 flowing in the unit light emitting diode columns 151, 152, 153, and 154 also have different values.

The light unit 200 may control the unit light emitting diode columns 151, 152, 153, and 154, allowing the unit light emitting diode columns 151, 152, 153, and 154 to uniformly emit light despite differences between the voltage drop (Vf) values. For example, the light unit 200 actively controls the unit light emitting diode columns 151, 152, 153, and 154 by the current deviation compensating unit 120.

First terminals of the unit light emitting diode columns 151, 152, 153, and 154 are respectively connected to input terminals of transistors TR1, TR2, TR3, and TR4. Respective control terminals of the transistors TR1, TR2, TR3, and TR4 are sequentially connected with the current deviation compensating unit 120 through a connection switch SW1. Each of the transistors TR1, TR2, TR3, and TR4 is controlled through the current deviation compensating unit 120. The unit light emitting diode column connected via the transistor with the connection switch SW1 is in a closed-circuit, and other unit light emitting diode columns that are not connected to the connection switch SW1 are opened. In other words, current flows through the unit light emitting diode column connected via the transistor to the connection switch SW1, but no current flows in other unit light emitting diode columns disconnected from the connection switch SW1. Further, the output terminals of the transistors TR1, TR2, TR3, and TR4 are connected to a first terminal of the second resistor R2, the switch controller 170, and the current deviation compensating unit 120. A second terminal of the second resistor R2 is grounded.

The current deviation compensating unit 120 includes an integrator 160 and two comparators OP1 and OP2. The integrator 160 includes a second capacitor C2 and a first resistor R1. A first terminal of the first resistor R1 is connected to the first terminal of the second resistor R2, the switch controller 170, and the output terminals of the transistors TR1, TR2, TR3, and TR4. A second terminal of the first resistor R1 is connected to a first terminal of the second capacitor C2. A second terminal of the second capacitor C2 is connected to an output terminal of the first comparator OP1 and a second input terminal of the second comparator OP2.

The first comparator OP1 and the second comparator OP2 each may include an OP-amp.

Each of the comparators OP1 and OP2 according to an exemplary embodiment of the present invention includes a first input terminal and a second input terminal. The first input terminal may be a positive terminal, and the second input terminal may be a negative terminal. A reference voltage Vref is input to the first input terminal of the first comparator OP1. A lamp voltage Ramp is input to the second comparator OP2. The connection switch SW1 is connected to the output terminal of the second comparator OP2. A pulse width modulation (PWM) signal is applied to each of the comparators OP1 and OP2 as operation power.

The switch controller 170 according to an exemplary embodiment of the present invention includes a counter 171.

Figure 2:
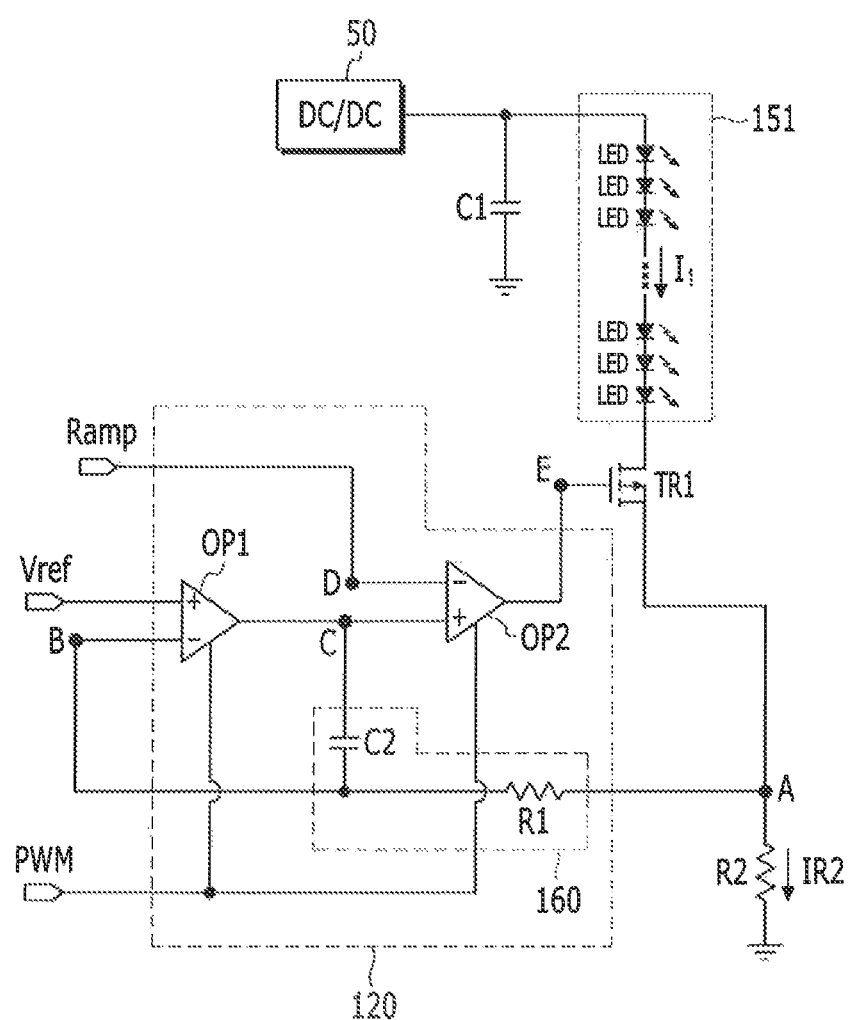
FIG. 2 is an equivalent circuit diagram when a connection switch is connected to a first transistor according to an exemplary embodiment of the present invention.

FIG. 2 is an equivalent circuit diagram when a connection switch is connected to a first transistor according to an exemplary embodiment of the present invention.

Figure 3:
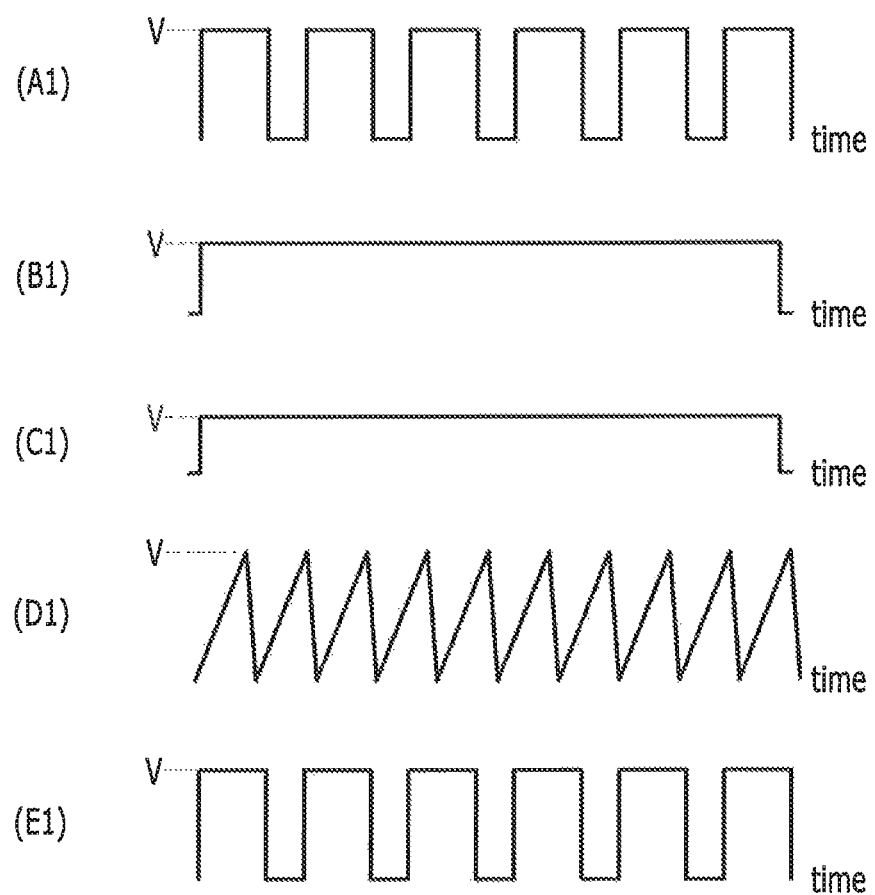
FIG. 3 is a waveform diagram for a signal at each point of FIG. 2.

FIG. 3 is a waveform diagram for a signal at each point of FIG. 2, according to an exemplary embodiment of the present invention.

The current deviation compensating unit 120 according to an exemplary embodiment of the present invention may compensate for a deviation between the currents I1, I2, I3, and I4 respectively flowing through the unit light emitting diode columns 151, 152, 153, and 154, by using a PWM average current control method.

Hereinafter, an example where the connection switch SW1 is connected to the first transistor TR1 is described, but exemplary embodiments of the present invention are not limited thereto. Exemplary embodiments of the present invention may be also applicable to when the connection switch SW1 is connected to other transistor, for example TR2, TR3, or TR4.

The current I1 flows through the light emitting diodes LED in the first unit light emitting diode column 151 as a voltage is applied to the first unit light emitting diode column 151 from the DC/DC converter 50. An input voltage having a pulse wave form is applied, based on the current I1, to a first terminal of the first resistor R1, e.g., an input terminal A of the current deviation compensating unit 120. (A1) of FIG. 3 is a waveform diagram illustrating the input voltage having the pulse wave form applied to the input terminal A of the current deviation compensating unit 120 based on the current I1.

The integrator 160 integrates the input voltage having the pulse wave form, obtaining a first DC voltage, and inputs the first DC voltage to the first comparator OP1. According to an exemplary embodiment of the present invention, the first DC voltage is applied to a second input terminal B of the first comparator OP1. (B1) of FIG. 3 is a waveform diagram illustrating the first DC voltage applied to the second input terminal B of the first comparator OP1 according to an exemplary embodiment of the present invention. The first DC voltage may be an average voltage of the input voltage.

The first comparator OP1 receives the first DC voltage and compares the first DC voltage with the reference voltage Vref, outputting a second DC voltage to the second comparator OP2. The reference voltage Vref according to an exemplary embodiment of the present invention is applied to the first input terminal of the first comparator OP1. The first comparator OP1 outputs the second DC voltage to a first input terminal C of the second comparator OP2. (C1) of FIG. 3 is a waveform diagram of the second DC voltage in the first input terminal C of the second comparator OP2.

The reference voltage Vref according to an exemplary embodiment of the present invention may be predetermined. The reference voltage Vref according to an exemplary embodiment of the present invention may be a target voltage, for example, an average voltage of the pulse voltage applied to the input terminal A of the current deviation compensating unit 120 when a target current flows through the light emitting diodes LED of the first unit light emitting diode column 151.

The second comparator OP2 receives the second DC voltage and compares the second DC voltage with the lamp voltage Ramp, outputting an output voltage to the first transistor TR1. According to an exemplary embodiment of the present invention, the lamp voltage Ramp is applied to a second input terminal D of the second comparator OP2. (D1) of FIG. 3 is a waveform diagram of the lamp voltage Ramp applied to the second input terminal D of the second comparator OP2. (E1) of FIG. 3 is a waveform diagram of the output voltage output from an output terminal E of the lamp voltage Ramp to a control terminal of the first transistor TR1.

The current I1 flowing through the light emitting diodes LED of the first unit light emitting diode column 151 is corrected based on the output voltage applied to the first transistor TR1. For example, according to an exemplary embodiment of the present invention, a duty ratio of the current I1 flowing through the light emitting diodes LED of the first unit light emitting diode column 151 may be corrected. The light emitting diodes LED of the first unit light emitting diode column 151 emits light based on the corrected current I1.

In the first transistor TR1, the ON/OFF timing of the first transistor TR1 is adjusted based on pulses of the output voltage applied to the control terminal, and accordingly, the current I1 having the pulse waveform of which the duty ratio is adjusted flows through the light emitting diodes LED of the first unit light emitting diode column 151. Substantially the same process as the process of correcting the current I1 may also be applied to the currents I2, I3, and I4 flowing through the light emitting diodes LED in the other unit light emitting diode columns 152, 153, and 154, and the currents I2, I3, and I4 may be thus corrected. Therefore, the duty ratio of each of the currents I1, I2, I3, and I4 is adjusted allowing the currents I1, I2, I3, and I4 flowing through the unit light emitting diode columns 151, 152, 153, 154 to have substantially the same average.

A current IR2 flows through the second resistor R2 based on the current I1. The waveform of the current IR2 may be the same as the current D.

Figure 4:
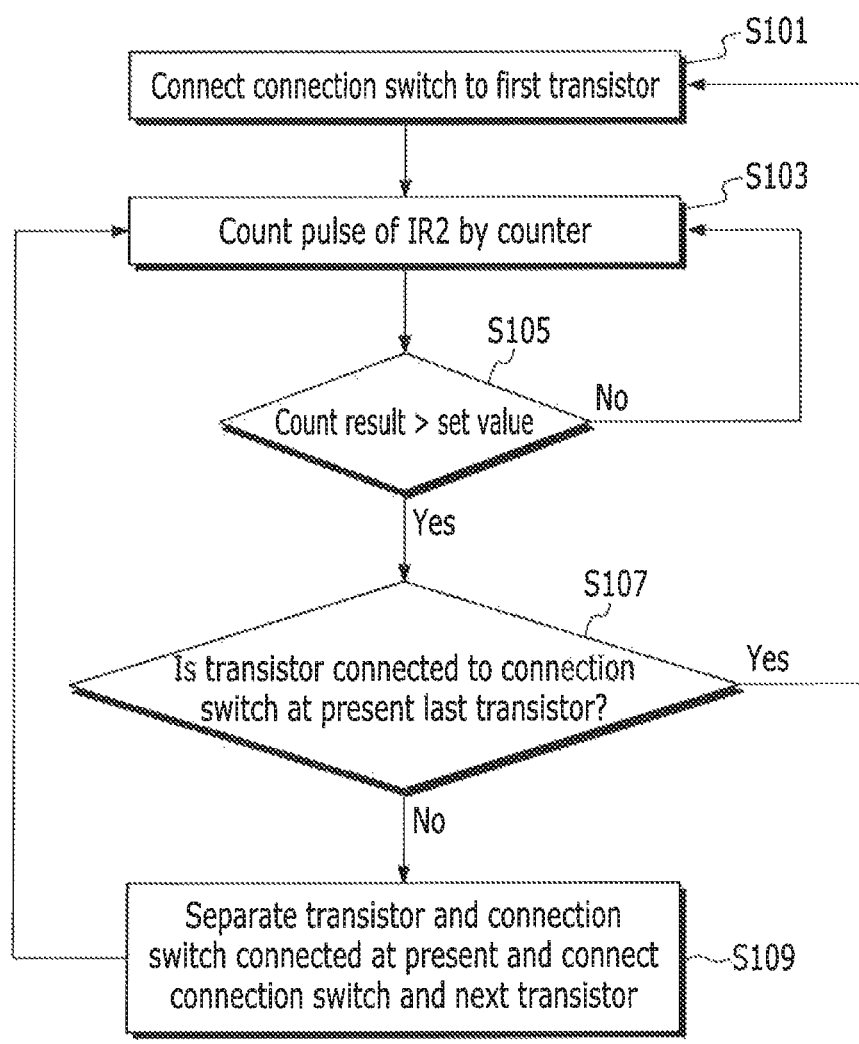
FIG. 4 is a flowchart of a method of operating a light unit according to an exemplary embodiment of the present invention.
Figure 5:
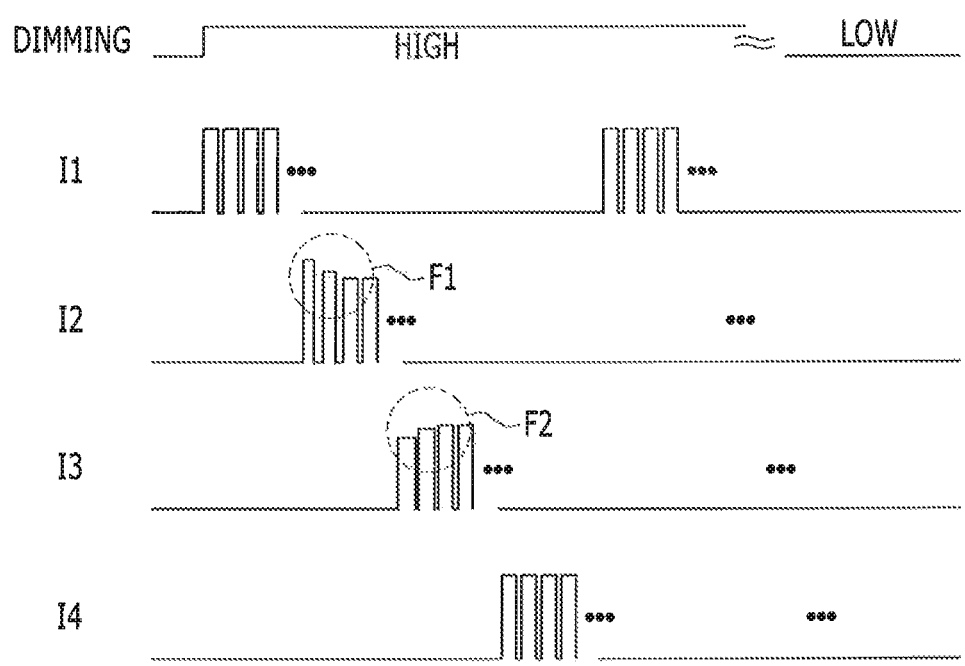
FIG. 5 is a waveform diagram of a current flowing in a light emitting diode (LED) of each unit light emitting diode column, according to an exemplary embodiment of the present invention.
Figure 6:
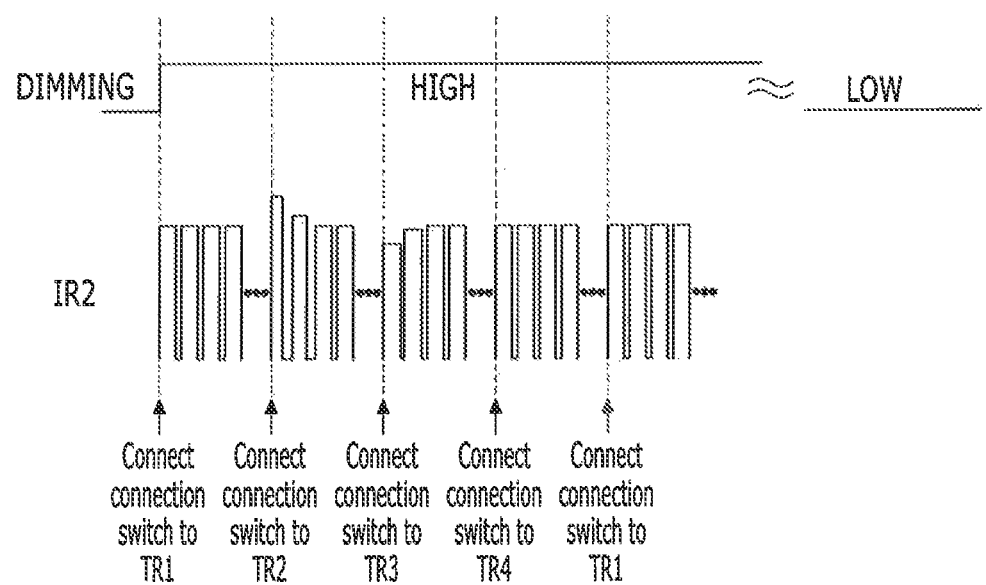
FIG. 6 is a waveform diagram of a current flowing in a second resistor, according to an exemplary embodiment of the present invention.

FIG. 4 is a flowchart of a method of operating a light unit according to an exemplary embodiment of the present invention. FIG. 5 is a waveform diagram of a current flowing through light emitting diodes LED of each unit light emitting diode column, according to an exemplary embodiment of the present invention. FIG. 6 is a waveform diagram of a current flowing through a second resistor, according to an exemplary embodiment of the present invention.

The connection switch SW1 is connected to the first transistor TR1 (S101). The current I1 flows through the light emitting diodes LED of the first unit light emitting diode column 151 when the connection switch SW1 is connected to the first transistor TR1. Accordingly, the current IR2 flows through the second resistor R2. The current I1 flowing through the light emitting diodes LED of the first unit light emitting diode column 151 may have a pulse waveform having a predetermined duty ratio.

The counter 171 counts the pulses of the current IR2 flowing through the second resistor R2 (S103). Referring to FIG. 6, when the connection switch SW1 is connected to the first transistor TR1, the current IR2 flowing through the second resistor R2 has a waveform based on the current I1 flowing through the light emitting diodes LED of the first unit light emitting diode column 151. Accordingly, the current IR2 flowing through the second resistor R2 may have the same duty ratio as the current I1 flowing through the light emitting diodes LED of the first unit light emitting diode column 151.

The switch controller 170 compares a result of the counting of the pulses of the current IR2 with a predetermined value (S105). When the result of the counting of the pulses of the current IR2 is not larger than the predetermined value, the counter 171 counts the pulses of the current IR2 flowing through the second resistor R2.

When the results of the counting of the pulses of the current IR2 is larger than the predetermined value, the switch controller 170 determines whether the transistor currently connected to the connection switch SW1 is the last transistor (S107). When the transistor connected to the connection switch SW1 is the last transistor, the connection switch SW1 is connected to the first transistor TR1.

When the transistor connected to the connection switch SW1 is not the last transistor, the switch controller 170 disconnects the connection switch SW1 from the transistor TR1 and connects the connection switch SW1 with another transistor (e.g., TR2) (S109). As illustrated in FIG. 5, when the switch controller 170 separates the transistor TR1 from the connection switch SW1, the current I1 does not flow through the light emitting diodes LED of the first unit light emitting diode column 151. When the switch controller 170 connects the connection switch SW1 to another transistor, e.g., the second transistor TR2, the current I2 flows through the light emitting diodes LED of the second unit light emitting diode column 152.

Referring to F1 of FIG. 5, a pulse wave of the current I2 flowing through the light emitting diode LED of the second unit light emitting diode column 152 is gradually decreased during a transient period that occurs when the voltage supply is shifted from the first transistor TR1 to the second transistor TR2 as the connection switch SW1 is disconnected from the first transistor TR1 and connected to the second transistor TR2. In this case, a magnitude of the voltage applied to the first transistor TR1 may be larger than a magnitude of the voltage to be applied to the second transistor TR2. However, as the duty ratio of the voltage applied to the second transistor TR2 is adjusted, the magnitude of the average voltage becomes uniform, and accordingly, the current I2 is rendered to have a uniform average.

When the connection switch SW1 is separated from the second transistor TR2, and the connection switch SW1 is connected to the third transistor TR3, as illustrated in FIG. 5, the current I2 does not flow through the light emitting diodes LED of the second unit light emitting diode column 152, and the current I3 flows through the light emitting diodes LED of the third unit light emitting diode column 153. As shown in FIG. 6, as the current I3 flows through the light emitting diodes LED of the third unit light emitting diode column 153, a current is rendered to flow through the second resistor R2.

Referring to F2 of FIG. 5, a pulse wave of the current I3 flowing through the light emitting diodes LED of the third unit light emitting diode column 153 is gradually increased during a transitional period that occurs when the voltage supply is shifted from the second transistor TR2 to the third transistor TR3 as the connection switch SW1 is disconnected from the second transistor TR2 and connected to the third transistor TR3. In this case, a magnitude of the voltage applied to the second transistor TR2 may be smaller than a magnitude of the voltage to be applied to the third transistor TR3. However, as the duty ratio of the voltage applied to the third transistor TR3 is adjusted, the magnitude of the average voltage becomes uniform, and accordingly, the current I3 may be rendered to have a uniform average.

When the connection switch SW1 is separated from the third transistor TR3, and the connection switch SW1 is connected to the fourth transistor TR4, as illustrated in FIG. 5, the current I3 does not flow through the light emitting diodes LED of the third unit light emitting diode column 153, and the current I4 flows through the light emitting diodes LED of the fourth unit light emitting diode column 154. As shown in FIG. 6, as the current I4 flows through the light emitting diodes LED of the fourth unit light emitting diode column 154, a current is rendered to flow through the second resistor R2.

When the connection switch SW1 is separated from the fourth transistor TR4, and the connection switch SW1 is connected to the first transistor TR1, as illustrated in FIG. 5, the current I4 does not flow through the light emitting diodes LED of the fourth unit light emitting diode column 154, and the current I1 flows through the light emitting diodes LED of the first unit light emitting diode column 151. As shown in FIG. 6, as the current I1 flows through the light emitting diodes LED of the first unit light emitting diode column 151, a current is rendered to flow through the second resistor R2.

The current IR2 flows through the second resistor R2 when the dimming signal is in a high state.

Figure 7:
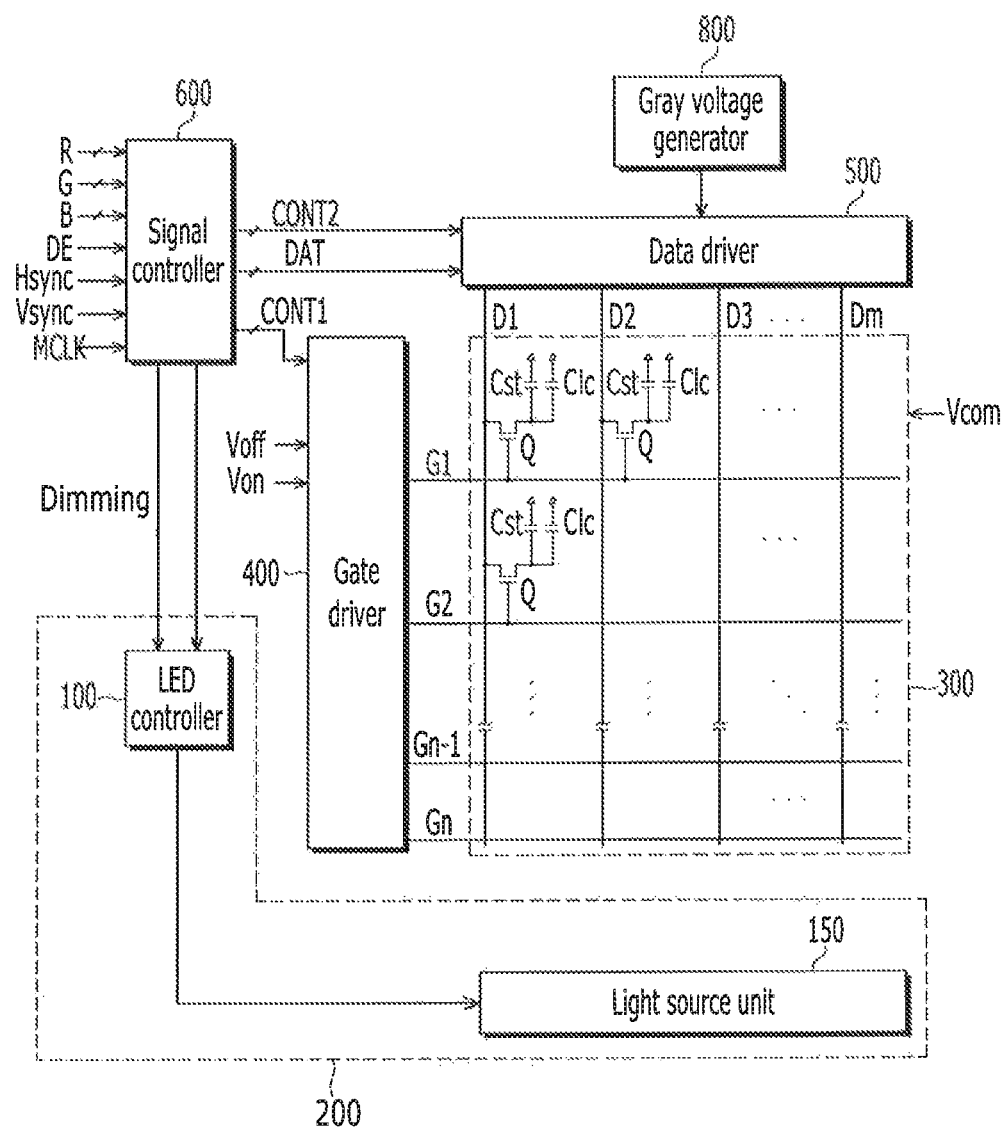
FIG. 7 is a block diagram illustrating a display device according to an exemplary embodiment of the present invention.

FIG. 7 is a block diagram illustrating a display device according to an exemplary embodiment of the present invention.

Referring to FIG. 7, the light unit 200 is turned on or off according to a state of a control signal (e.g., a dimming signal) provided from a signal controller 600. According to an exemplary embodiment of the present invention, the LED controller turns on and off the light emitting diode LED of the light source unit 150 based on the state of the dimming signal provided from the signal controller 600.

The display device according to an exemplary embodiment of the present invention includes a liquid crystal panel assembly 300 (also referred to as a display panel), a gate driver 400, a data driver 500, a gray voltage generator 800, and the signal controller 600.

The liquid crystal panel assembly 300 includes a plurality of signal lines G1-Gn and D1-Dm and a plurality of pixels PX. The plurality of pixels PX are connected to the signal lines G1-Gn and D1-Dm and are arranged substantially in a matrix form. The liquid crystal panel assembly 300 includes lower and upper panels facing each other, and a liquid crystal layer interposed therebetween.

Each pixel includes a switching element Q connected to its corresponding signal lines (one of the gate lines G1-Gn and one of the data lines D1-Dm), a liquid crystal capacitor Clc connected thereto, and a storage capacitor Cst. The switching element Q is a three-terminal element such as a thin film transistor, which is provided in the lower panel, and the switching element Q has a control terminal connected to its corresponding one of the gate lines G1-Gn, an input terminal connected to its corresponding one of the data lines D1-Dm, and an output terminal connected to the liquid crystal capacitor Clc and the storage capacitor Cst. At least one polarizer for polarizing light is attached to an outer surface of the liquid crystal panel assembly 300.

The gray voltage generator 800 generates two sets of gray voltages associated with transmittance of the pixel. One of the two sets may have positive values with respect to a common voltage Vcom, and the other set may have negative values.

The gate driver 400 is connected to the gate lines G1-Gn of the liquid crystal panel assembly 300 and applies gate signals to the gate lines G1-Gn. The gate signals are configured by combining a gate-on voltage Von and a gate-off voltage Voff.

The data driver 500 is connected to the data lines D1-Dm of the liquid crystal panel assembly 300. The data driver 500 selects gray voltages from the gray voltage generator 800 and applies the selected gray voltages to the data lines D1-Dm as data signals.

The signal controller 600 controls the gate driver 400 and the data driver 500. For example, the signal controller 600 receives input image signals R, G and B and an input control signal for controlling display of the input image signals R, G and B from an external graphic controller (not illustrated). Examples of the input control signal includes a vertical synchronization signal Vsync, a horizontal synchronization signal Hsync, a main clock MCLK, and a data enable signal DE.

The signal controller 600 processes the input image signals R, G and B in accordance with the operational condition of the liquid crystal panel assembly 300 based on the input image signals R, G and B and the input control signals and generates a gate control signal CONT1 and a data control signal CONT2, and then transmits the gate control signal CONT1 to the gate driver 400 and transmits the data control signal CONT2 and a processed image signal DAT to the data driver 500.

According to an exemplary embodiment of the present invention, since a current deviation compensating unit sequentially controls each of unit light emitting diode columns through a connection switch, the number of current deviation compensating units may be reduced. Accordingly, the wiring in the light unit may be less complicated.

While this invention has been shown and described in connection with exemplary embodiments thereof, it is to be understood by one of ordinary skill in the art that various changes in form and detail may be made thereto without departing from the spirit and scope of the present invention as defined by the following claims.

What is claimed is:

1. A light unit, comprising:
   a DC/DC converter;
   a plurality of unit light emitting diode columns receiving a voltage applied from the DC/DC converter;
   a plurality of transistors respectively connected to the plurality of unit light emitting diode columns;
   a current deviation compensating unit configured to compensate for deviations between currents respectively flowing through the plurality of unit light emitting diode columns by a pulse current width modulation average current control method;
   a connection switch sequentially connecting the current deviation compensating unit with the plurality of transistors;
   a resistor having a first terminal, directly connected to output terminals of the plurality of transistors and the current deviation compensating unit, and a second terminal connected to ground; and
   a switch controller directly connected to the first terminal of the resistor, and configured to control connection between the connection switch and the current deviation compensating unit based on a signal applied to the resistor,
   wherein the output terminals of the plurality of transistors share a common connection to the resistor.

2. The light unit of claim 1, wherein the switch controller is configured to count pulses of the signal applied to the resistor and is configured to control the connection switch based on the pulse count.

3. The light unit of claim 2, wherein the switch controller further comprises a counter configured to count the pulses of the signal applied to the resistor.

4. The light unit of claim 3, wherein the switch controller is configured to compare the pulse count with a predetermined value to disconnect the connection switch from a transistor and connect the connection switch with another transistor when the pulse count is larger than the predetermined value.

5. The light unit of claim 3, wherein the switch controller is configured to compare the pulse count with a predetermined value and to determine whether a transistor connected to the connection switch is a last transistor when the pulse count is larger than the predetermined value and is configured to disconnect the connection switch from the transistor when the transistor is not the last transistor and to connect the connection switch with another transistor.

6. The light unit of claim 3, wherein the switch controller is configured to compare the pulse count with a predetermined value and to determine whether a transistor connected to the connection switch is a last transistor when the pulse count is larger than the predetermined value to disconnect the connection switch from the transistor when the transistor is the last transistor and to connect the connection switch with a first transistor.

7. A display device, comprising:
   a display panel;
   a gate driver connected to the display panel;
   a data driver connected to the display panel;
   a light unit providing light to the display panel; and
   a signal controller configured to control the display panel, the gate driver, the data driver, and the light unit,
   wherein the light unit comprises:
   a DC/DC converter;
   a plurality of unit light emitting diode columns receiving a voltage applied from the DC/DC converter;
   a plurality of transistors respectively connected to the plurality of unit light emitting diode columns;
   a current deviation compensating unit configured to compensate for deviations between currents respectively flowing through the plurality of unit light emitting diode columns by a pulse current width modulation average current control method;
   a connection switch sequentially connecting the current deviation compensating unit with the plurality of transistors;
   a resistor having a first terminal, directly connected to output terminals of the plurality of transistors and the current deviation compensating unit, and a second terminal connected to ground; and
   a switch controller directly connected to the first terminal of the resistor, and configured to control connection between the connection switch and the current deviation compensating unit based on a signal applied to the resistor,
   wherein the current deviation compensating unit comprises at least one comparator,
   the at least one comparator includes an output terminal, and
   the connection switch is connected between the output terminal of the at least one comparator and a control terminal of at most one of the plurality of transistors.

8. The display device of claim 7, wherein the switch controller is configured to count pulses of the signal applied to the resistor and is configured to control the connection switch based on the pulse count.

9. The display device of claim 8, wherein the switch controller further comprises a counter configured to count the pulses of the signal applied to the resistor.

10. The display device of claim 9, wherein the switch controller is configured to compare the pulse count with a predetermined value to disconnect the connection switch from a transistor and connect the connection switch with another transistor when the pulse count is larger than the predetermined value.

11. The display device of claim 9, wherein the switch controller is configured to compare the pulse count with a predetermined value and to determine whether a transistor connected to the connection switch is a last transistor when the pulse count is larger than the predetermined value and is configured to disconnect the connection switch from the transistor when the transistor is not the last transistor and to connect the connection switch with another transistor.

12. The display device of claim 9, wherein the switch controller is configured to compare the pulse count with a predetermined value and to determine whether a transistor connected to the connection switch is a last transistor when the pulse count is larger than the predetermined value to disconnect the connection switch from the transistor when the transistor is the last transistor and to connect the connection switch with a first transistor.

13. The display device of claim 12, wherein the signal controller is configured to output a dimming signal, and wherein the DC/DC converter is configured to apply the voltage to the plurality of unit light emitting diode columns based on a state of the dimming signal.

14. The display device of claim 13, wherein the DC/DC converter is configured to apply the voltage to the plurality of unit light emitting diode columns when the dimming signal is in a high state.

15. The display device of claim 13, wherein the DC/DC converter is configured not to apply the voltage to the plurality of unit light emitting diode columns when the dimming signal is in a low state.

* * * * *